(12) United States Patent
Pugh

(10) Patent No.: US 10,657,053 B2
(45) Date of Patent: May 19, 2020

(54) MEMORY ALLOCATION TECHNIQUES FOR FILTERING SOFTWARE

(71) Applicant: KYOCERA Document Solutions Inc., Osaka (JP)

(72) Inventor: Eric Pugh, Torrance, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 201 days.

(21) Appl. No.: 15/476,628

(22) Filed: Mar. 31, 2017

(65) Prior Publication Data

US 2018/0285265 A1 Oct. 4, 2018

(51) Int. Cl.
*G06F 12/0806* (2016.01)
*G06F 3/12* (2006.01)

(52) U.S. Cl.
CPC ........ *G06F 12/0806* (2013.01); *G06F 3/1206* (2013.01); *G06F 3/1247* (2013.01); *G06F 3/1285* (2013.01); *G06F 3/1243* (2013.01)

(58) Field of Classification Search
CPC ............... G06F 12/0806; G06F 12/023; G06F 12/0223; G06F 12/0871; G06F 2212/621; G06F 3/1206; G06F 3/1261; G06F 3/1286; G06F 3/122; G06F 15/1813; G06F 15/1817; G06F 2215/0011; G06F 2215/0017; H03M 7/30; H03M 7/3091; H03M 7/3084; H03M 7/40
See application file for complete search history.

(56) References Cited

U.S. PATENT DOCUMENTS

| | | | |
|---|---|---|---|
| 5,479,655 A | 12/1995 | Iwamoto et al. | |
| 5,875,442 A * | 2/1999 | Jordan, II | ............. G06F 12/023 |
| 7,370,171 B1 * | 5/2008 | Jeyaram | .............. G06F 11/3636 |
| | | | 710/310 |
| 7,392,362 B2 | 6/2008 | Yamauchi et al. | |
| 7,747,821 B1 * | 6/2010 | Singh | .................. G06F 12/0804 |
| | | | 711/118 |
| 9,037,448 B2 | 5/2015 | Ito et al. | |
| 9,947,075 B2 * | 4/2018 | Nishida | ................. G06T 1/0007 |
| 2002/0194609 A1 * | 12/2002 | Tran | ................. H04N 21/42692 |
| | | | 725/95 |

(Continued)

OTHER PUBLICATIONS

Merriam-Webster, 2019, https://www.merriam-webster.com/dictionary/decompression (Year: 2019).*

(Continued)

*Primary Examiner* — Michael Krofcheck
(74) *Attorney, Agent, or Firm* — McDonnell Boehnen Hulbert & Berghoff LLP

(57) ABSTRACT

Methods and apparatus for filtering input data objects are provided. A computing device can receive an input data object to be filtered; e.g., compressed/decompressed, decrypted/encrypted, bit converted. The computing device can determine whether the input data object has been previously filtered. After determining that the input data object has been previously filtered, the computing device can: determine a previously filtered data size for the input data object, allocate a memory buffer to store a filtered version of the input data object based on the previously filtered data size, and filter the input data object using the memory buffer. The computing device can generate an output based on the filtered data object.

17 Claims, 14 Drawing Sheets

(56) References Cited

U.S. PATENT DOCUMENTS

| | | | | |
|---|---|---|---|---|
| 2006/0206668 A1* | 9/2006 | Uwatoko | ............ | G06F 12/0802 711/118 |
| 2006/0273933 A1* | 12/2006 | Kerber | ................ | H03M 7/3084 341/50 |
| 2007/0280543 A1* | 12/2007 | Matsuhira | .............. | H04N 19/60 382/233 |
| 2011/0261228 A1* | 10/2011 | Peng | .................... | H04N 1/2145 348/231.6 |
| 2014/0223029 A1* | 8/2014 | Bhaskar | .............. | H03M 7/3088 709/247 |
| 2015/0135002 A1* | 5/2015 | Harpaz | ............... | G06F 11/2094 714/6.3 |
| 2015/0193342 A1* | 7/2015 | Ohara | ................. | G06F 12/0873 711/120 |
| 2016/0085555 A1* | 3/2016 | Gopal | .................. | G06F 9/3818 711/125 |
| 2017/0301056 A1* | 10/2017 | Nishida | ................ | G06T 1/0007 |

OTHER PUBLICATIONS

PDF Reference, Sixth Edition, Adobe Portable Reference Format, Version 1.7, Nov. 2006, Chapter 3.3, Filters (34 pages).
P. Deutsch, Network Working Group, Request for Comments: 1951, Category: Informational, Deflate Compressed Data Format Specification, Version 1.3, May 1996 (15 pages).

* cited by examiner

320 Filtering Coordinator 700

710 Determine a last used buffer size LAST, with LAST initialized to 0.

720 Determine a length LTH of IFDS 310

730 LTH > LAST?

NO

YES

740 Set LAST = LTH

END

FIG. 7

320 Filtering Coordinator
800

810 Determine a minimum-memory-shrinkage value SHRINK.

820 Determine a length LTH of filtered IFDS 310

830 Determine an allocated memory buffer size ALLOC of buffer B1 for storing filtered IFDS 310

840 Determine DIFF = ALLOC - LTH

850 DIFF > SHRINK?

NO

YES

860 Free at least some of the unused memory in B1; e.g., add some unused memory from B1 to free memory pool

END

1410 Receive, at a computing device, an input data object to be filtered by the computing device

1420 Determine whether the input data object has been previously filtered by the computing device

1430 After determining that the input data object has been previously filtered by the computing device,
- Determine a previously filtered data size for the input data object
- Allocate a memory buffer to store an filtered version of the input data object based on the previously filtered data size
- Filter the input data object using the memory buffer

1440 Generate an output of the computing device that is based on the filtered data object

FIG. 14

MEMORY ALLOCATION TECHNIQUES FOR FILTERING SOFTWARE

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server.

The networks can include many printing devices. Some or all of the printing devices can have different features, functions, and capabilities. For example, some printing devices print in color, while others do not. As another example, some printing devices are equipped with duplexing hardware that allows printing on both sides of a sheet of paper, while other printing devices can only print on one side of a sheet of paper.

Printing devices can print data, such as image data, that is encoded in one or more formats. Examples of these formats include Kyocera Page Description Language (KPDL), Printer Command Language (PCL), Portable Document Format (PDF), the generic Page Description Language (PDL), and PostScript. Other formats are possible as well.

SUMMARY

In one aspect, a method is provided. A computing device receives an input data object to be filtered by the computing device. The computing device determines whether the input data object has been previously filtered by the computing device. After determining that the input data object has been previously filtered, the computing device: determines a previously filtered data size for the input data object; allocates a memory buffer to store a filtered version of the input data object based on the previously filtered data size; and filters the input data object using the memory buffer. The computing device generates an output of the computing device that is based on the filtered data object.

In another aspect, a computing device is provided. The computing device includes one or more processors and data storage. The data storage is configured to store computer-readable instructions that, when executed by the one or more processors, cause the computing device to perform functions. The functions include: receiving a input data object; determining whether the input data object has been previously filtered by the computing device; after determining that the input data object has been previously filtered: determining a previously filtered data size for the input data object; allocating a memory buffer to store a filtered version of the input data object based on the previously filtered data size, and filtering the input data object using the memory buffer; and generating an output that is based on the filtered data object.

In another aspect, an article of manufacture is provided. The article of manufacture includes a non-transitory data storage that is configured to store at least computer-readable instructions. The computer-readable instructions, when executed by one or more processors of a computing device, cause the computing device to perform functions. The functions include: receiving a input data object; determining whether the input data object has been previously filtered; after determining that the input data object has been previously filtered: determining a previously filtered data size for the input data object, allocating a memory buffer to store a filtered version of the input data object based on the previously filtered data size, and filtering the input data object using the memory buffer; and generating an output that is based on the filtered data object.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 7 shows a flowchart of even another method executable by the filtering coordinator of FIG. 3, according to an example embodiment.

FIG. 8 shows a flowchart of still another method executable by the filtering coordinator of FIG. 3, according to an example embodiment.

FIG. 14 shows a flowchart for a method executable by a computing device, according to an example embodiment.

DETAILED DESCRIPTION

Figure 1:
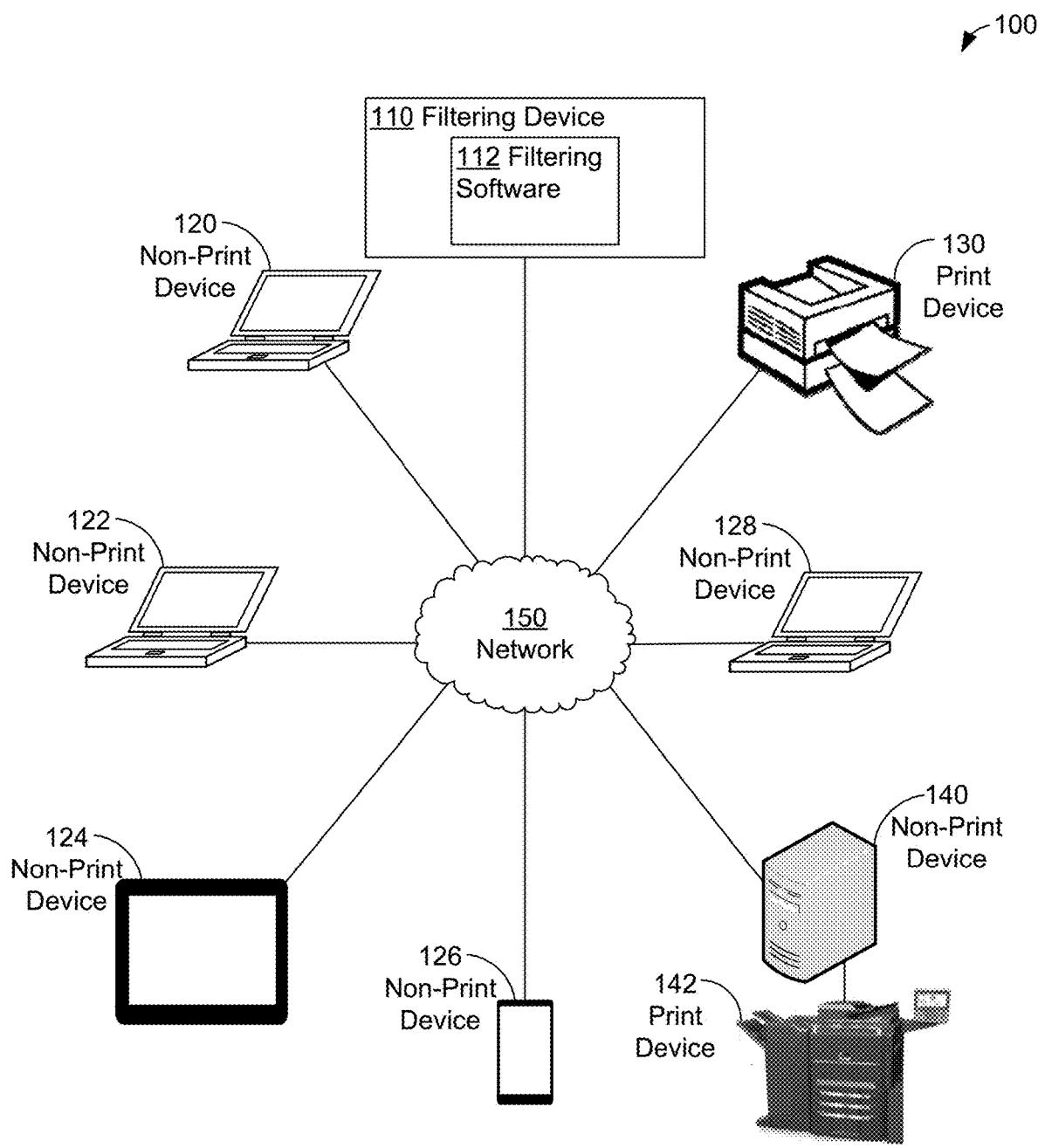
FIG. 1 is a diagram illustrating a printing network, according to an example embodiment.

Example apparatus and methods are described herein related to memory allocation for filtering input data. Filtering input data can involve transforming input data to obtain, as an output, filtered input data, where examples of filtering input data can include, but are not limited to, compressing the input data, decompressing the input data, encrypting the input data, decrypting the input data, and performing data conversions, such as a conversion of ASCII encoded data to binary data or vice versa, on the input data. Examples of input data include, but are not limited to, one or more files and/or data streams including textual, video, audio, binary, and/or other data.

To filter input data using a computing device, such as a computing device associated with and/or embedded within a printing device, computer memory can be allocated to store the input data and/or the filtered input data. For example, a buffer of computer memory can be allocated to store the filtered input data so that the buffer of filtered input data can be later processed; e.g., printed to paper, permanently stored, and communicated to another computing device, etc. For example, an input file can be encrypted on one computing device CD1 and then communicated in encrypted format to another computing device CD2. On CD1, filtering the input data can include encrypted the input file; while on CD2, filtering the input data can include decrypted the received encrypted input file.

As another example, filtering data can involve decompressing a compressed data stream or file. For example, the compressed data stream or file can be formatted using a Portable Document Format (PDF). A PDF data stream or file can be compressed using various data compression techniques, where some of the data compression techniques do not provide information about a size of uncompressed data, until the compressed data stream or file has already been decompressed. An example data compression technique that does not provide information about a size of uncompressed data is the Flate data compression technique that utilizes the zlib compressed data format described in Request for Comments (RFC) #1950 and RFC #1951, both promulgated by the Internet Engineering Task Force. At time of decompression, the zlib compressed data format only provides information about the size of a compressed data entity, not information about the size of the corresponding decompressed data entity.

Herein are described techniques to reduce the amount of time required to allocate memory, including when allocating memory while filtering input data, for a data entity where the size of the data entity is unknown. For example, the data entity can be a data object, buffer, or other data structure that includes at least part of the input data and/or the filtered input data.

Allocating memory for a data entity whose size is unknown can pose some challenges. When the size of the data entity is unknown, a size of the data entity can be estimated and then the estimated size can be used to specify an amount of allocated memory for the data entity. If this estimated data entity size is too large, memory can be wasted, while if the estimated data entity size is too small, memory for the data entity can be reallocated, which can lead to wasting time in copying data from a relatively-small data entity to a relatively-large data entity. Further, filtered input data could be cached in a system cache, but the size of filtered input data may exceed a size of the system cache and/or the filtered input data can be replaced in the system cache by other data.

Another technique used to allocated memory is memory buffer extension, where upon filling one memory buffer with filtered input data, then another memory buffer is obtained to store additional filtered input data. Thus, the filtered input data can be stored in multiple memory buffers. Data structure(s) and/or data object(s) can track the relationships between the multiple memory buffers, such as which was the first buffer used to store filtered input data, the last buffer used to store filtered input data, etc.; e.g., a memory-buffer object, a list, an array, a linked list, a queue, a stack, and/or one or more other data structures suitable for managing multiple memory buffers However, this technique incurs the overhead of managing a number, perhaps a large number, of memory buffers and the relationships between the memory buffers. Another drawback to memory buffer extension is that use of multiple buffers may not satisfy application requirements for using contiguous memory buffers; e.g., if an application of the filtered input data utilizes a hardware accelerator or other technology that requires use of contiguous memory buffers. In these examples, reallocation can be performed, which can involve allocating a larger contiguous buffer than previously allocated, copying already-filtered input data from the previously-allocated buffer to the larger buffer, and perhaps "freeing" or releasing memory of the (smaller) previously-allocated buffer to a free memory pool for other uses.

To better allocate memory, including contiguous memory, for filtering input data, a relatively accurate estimate for the size of the input data can be obtained. The estimate can be a maximum memory size allocated for all filtered input data, a last used memory size, an average memory size allocated over all filtered input data, and/or an actual size of the filtered memory data. The actual size of the filtered memory data can be obtained using the system cache. For example, suppose a set of input data has multiple references to a particular data item; e.g., multiple references to an image, audio data, or other data that is replicated within the input data. Then, the first time a referred-to set of input data is filtered, the size of the filtered input data along with an identifier of the set of input data and perhaps other information, can be stored as a cache entry in a cache, such as the system cache. At a later time, a second reference to the referred-to set of input data can be processed during filtering; the previously-stored cache entry can be retrieved using an identifier for the second reference, and then the actual size of the previously-filtered input data obtained from the previously-stored cache entry.

By better estimating memory sizes, including storing actual filtered input size information in a cache, the number of possible references stored in a fixed-size cache, such as many system caches, can be increased in comparison to storing entire filtered input data items. Further, storing and later using actual sizes of data to allocate memory can avoid time and resources used in reallocation and save memory in comparison to larger-than-actual-size buffers; i.e., these buffers have excess memory allocated. Additionally, the use of size information estimates allows for the use of contiguous memory allocation, which can speed many applications (as contiguous memory access is often faster than accessing non-contiguous memory) and be required by particular applications, such as applications sharing buffers with hardware and/or other resources that require the use of contiguous buffers.

Example Printing Systems

FIG. 1 is a diagram illustrating printing network 100, according to an example embodiment. Printing network 100 includes filtering device 110, one or more non-printing devices 120, 122, 124, 126, 128, 140 and one or more printing devices 130, 142 interconnected using network 150. In some examples, printing network 100 can have more, fewer, and/or different types of filtering devices, non-printing devices, and/or printing devices than indicated in FIG. 1.

Filtering device 110 and/or non-printing devices 120, 122, 124, 126, 128 can be or include computing devices configured to communicate with each other and with printing devices 130, 142 using network 150. Filtering device 110 can be a printing or non-printing device that includes filtering software 112. Filtering software 112 can receive input data for filtering, such as, but not limited to input data streams and/or files of images, documents, and/or other data, and generate filtered output based on the input data. In some examples, the filtered output can be displayed, printed, and/or communicated by filtering device 110. Filtering of input data to generate filtered output can include, but is not limited to, compressing the input data, decompressing the input data, encrypting the input data, decrypting the input data, and performing data conversions, such as a conversion of ASCII encoded data to binary data or vice versa, on the input data.

Printing devices 130, 142 can include devices configured to scan, print, copy, e-mail, account, communicate, and/or otherwise process images, documents, and/or files that are originally available either on paper or electronically. In printing network 100, a non-printing device can be a computing device that is not a printing device, where the non-printing device can be configured to communicate with other non-printing devices and with printing devices 130, 142 using network 150. In particular, a non-printing device typically does not print images, documents, and/or files to paper and typically does not scan images, documents, and/or files from paper, while printing devices typically do print images, documents, and/or files to paper and typically do scan images, documents, and/or files from paper.

After processing by one or more of printing devices 130, 142, the images, documents, and/or files can be subsequently available either on paper or electronically, as requested. That is, printing devices 130, 142 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 130, 142 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 130, 142 can perform other tasks and/or other processing as well. Printing devices 130, 142 can include products from various manufacturers with variations in color, speed, computing power, functionality, network connectivity, and/or other features.

In an example embodiment, some or all printing devices 130, 142 can be connected to network 150 through one or more, possibly different, network protocols. Data can be transmitted between printing devices 130, 142, non-printing devices 120, 122, 124, 126, 128, 140 over wired and/or wireless links between non-printing devices, printing devices, and network 150. The format of each respective data transmission between devices in printing network 100 can include one or more of a variety of different formats including: text formats, image formats, extensible mark-up language (XML), database tables, a flat file format, or another format. In some embodiments, a non-printing device can be configured to act as a print server for one or more printing devices. A print server can be configured to process jobs (e.g., spool job-related data, route jobs, provide user and/or server-related accounting for jobs, verify/enforce authentication and authorization rules related to jobs) and store data related to printing devices in printing network 100. For example, in network 150, non-printing device 140 is configured to be a print server for at least printing device 142.

Communications between the non-printing devices, and printing devices can include: filtering device 110 and/or non-printing devices 120, 122, 124, 126, 128, 140 sending data for print jobs and/or print job portions for printing to printing devices 130, 142 and printing devices 130, 142 sending alert, status, error, and/or other messages to inform other devices about error or other conditions of the printing devices; e.g., idle, printing, sleeping, paper jam, low or out of paper, low or out of toner/ink, etc. Other communications between one or more filtering devices, one or more non-printing devices, and one or more printing devices are possible as well; e.g., the communications described below related to filtering device 110 and/or filtering software 112.

Example Computing Devices

Figure 2:
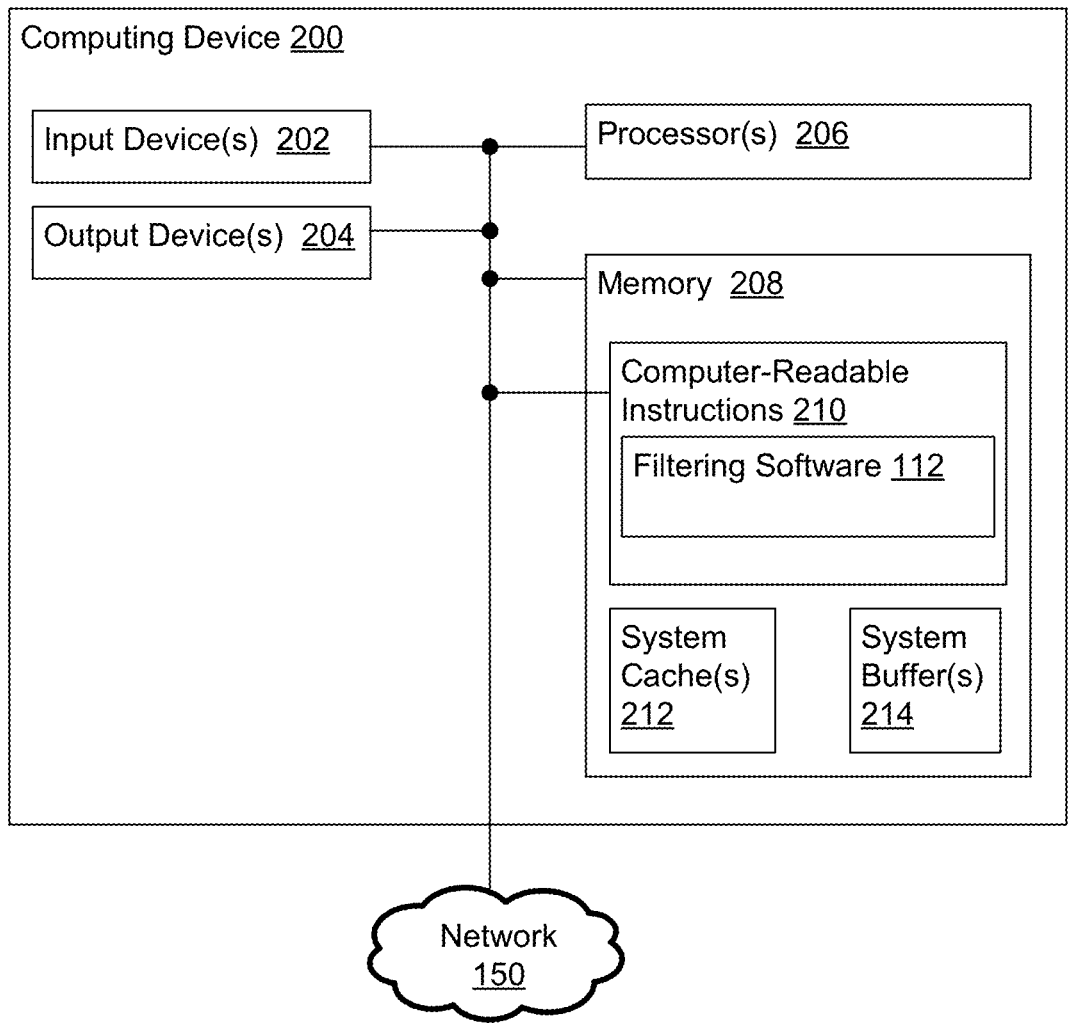
FIG. 2 is a schematic block diagram illustrating a computing device, according to an example embodiment.

FIG. 2 is a schematic block diagram illustrating computing device 200, according to an example embodiment. In some embodiments, computing device 200 can be configured to perform one or more herein-described functions of and/or related to: printing network 100, filtering device 110, filtering software 112, non-printing devices 120, 122, 124, 126, 128, 140, printing devices 130, 142, filtering coordinator 320, filter(s) 322, memory buffer(s) 324, memory cache(s) 326, methods 400, 500, 600, 700, 800, 900, and 1400, and scenario 1000.

Computing device 200 can include one or more input devices 202, one or more output devices 204, one or more processors 206 and memory 208. Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 150, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 150. Sensors can include devices configured to measure conditions in an environment of computing device 200 and provide data about that environment, such data including, but not limited to, location data, velocity (speed, direction) data, acceleration data, and other data about the environment for computing device 200. Example sensors include, but are not limited to, GPS sensor(s), location sensors(s), gyroscope(s), accelerometer(s), magnetometer(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB)

transceiver, or similar transceiver configurable to communicate via a twisted pair wire, a coaxial cable, a fiber-optic link, or a similar physical connection to a wireline network, such as wired portions of network 150, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 150. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 206 can be configured to execute computer-readable program instructions 210 that are contained in memory 208 and/or other instructions as described herein.

Memory 208 can include non-transitory machine-readable storage configured to store data and/or instructions. In particular, memory 208 can store machine-readable instructions 210 that, when executed by processor(s) 206, can cause a computing device to perform functions, such as but not limited to, functions of herein-described software, devices, networks, methods, features, and scenarios. In particular, machine-readable instructions 210, when executed by processor(s) 206, can cause a computing device to perform functions of filtering software 112.

In some examples, memory 208 can include one or more system caches 212 and/or one or more system buffers 214. System cache(s) 212 can be one or more memory regions that can be accessed more rapidly by processor(s) 206 than other portions of memory 208. In particular, system cache(s) 212 can be implemented using memory hardware specifically designed to act as a cache; i.e., cache hardware can be physically closer to and/or be integrated into processor(s) 206, can be implemented on separate chip(s) than used for the remainder of memory 208, can have specific memory bus interconnections, etc.

System buffer(s) 214 can be one or more memory region(s) of memory 208 that are allocated by an operating system, memory management, and/or other system software administering computing device 200. In some examples, a user utilizing and/or an application executing on computing device 200 can request allocation of part or all of system buffer(s) 214 and/or system cache(s) 212 explicitly; e.g., by way of a system/function call to the operating system, memory management, and/or other system software administering computing device 200. In specific examples, the user and/or the application can request allocation of part or all of system buffer(s) 214 and/or system cache(s) 212 explicitly; e.g., by way of a system/function call to the operating system, memory management, and/or other system software administering computing device 200. In other examples, the user and/or the application can request allocation of part or all of system buffer(s) 214 and/or system cache(s) 212 implicitly; e.g., by using memory while a user is utilizing computing device 200 and/or an application executing on computing device 200 which causes the operating system, memory management, and/or other system software administering computing device 200 to allocate part or all of system buffer(s) 214 and/or system cache(s) 212 on behalf of the user and/or application.

Example Techniques and Scenarios for Filtering Input Data Files/Data Streams

Figure 3:
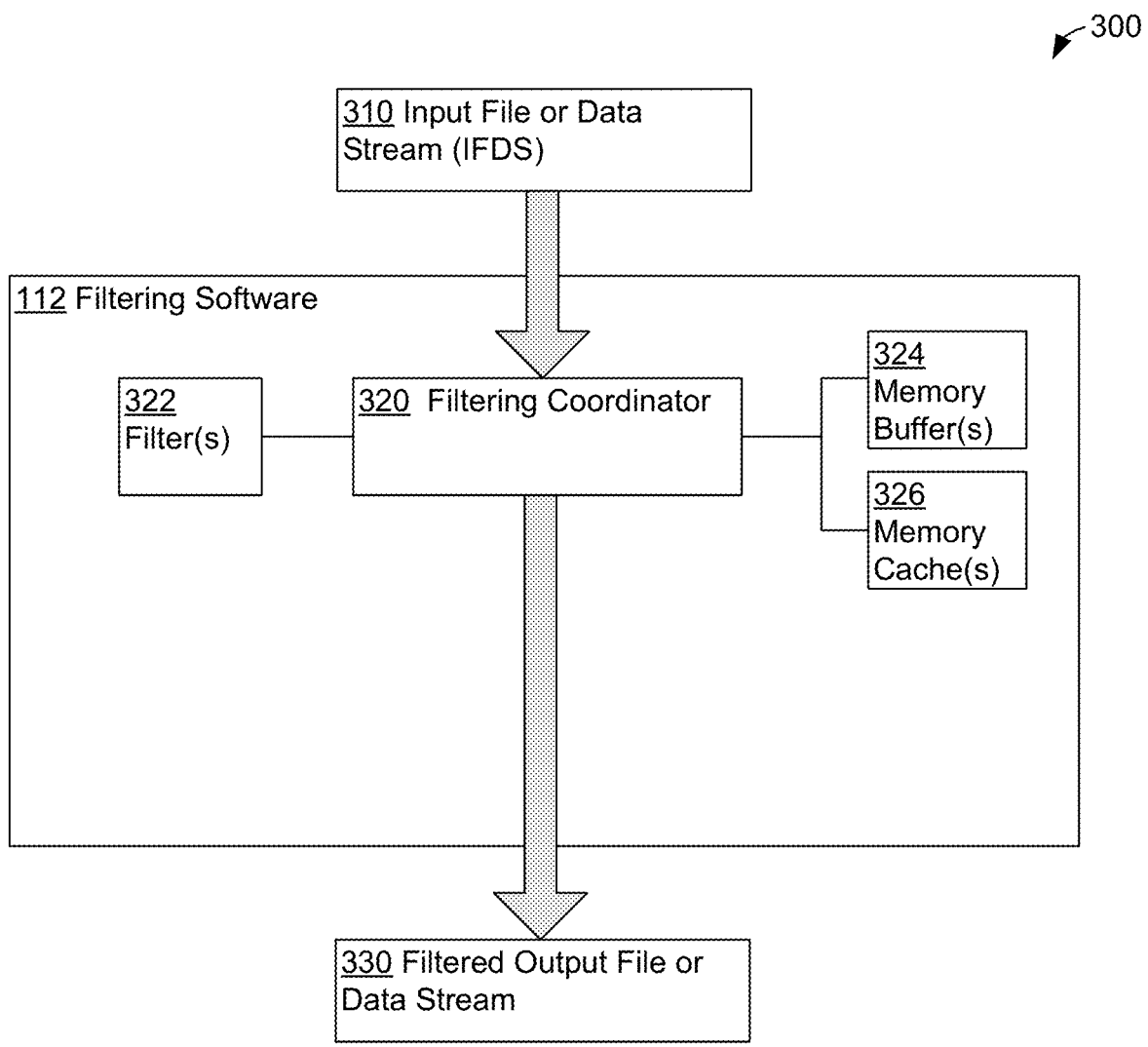
FIG. 3 is a block diagram of filtering software, according to an example embodiment.

FIG. 3 is a block diagram of filtering software 112, according to an example embodiment. Filtering software 112 can receive input file or data stream (IFDS) 310 as an input and generate filtered output file or data stream 330 as an output. Filtering software 112 can be configured to, when executed, use one or more software components, such as filtering coordinator 320 and one or more filters 322, and utilize computer memory, such as one or more memory buffers 324 and/or one or more memory caches 326, to generate filtered output file or data stream 330 based on input file or data stream 310. In some embodiments, filtering software 112 can generate one or more outputs that include at least one of: one or more printed pages that are based on filtered output file or data stream 330, a display based on filtered output file or data stream 330, and an electronic file that is based on filtered output file or data stream 330.

For example, filtered output file or data stream 330 can be generated by filtering input file or data stream 310, which can involve filtering coordinator 320 and/or other functionality of filtering software 112 applying one or more filters 322 to input file or data stream 310. Some specific types of filtering of input data are mentioned above in the context of at least FIG. 1. When a filter of filters 322 is applied, the filter can perform some or all of the specific types of filtering; e.g., a compression-related filter of filter(s) 322 can be used to compress or decompress input file or data stream 310 to generate filtered (compressed or decompressed) output file or data stream 330, a encryption-related filter of filter(s) 322 can be used to encrypt or decrypt input file or data stream 310 to generate filtered (encrypted or decrypted) output file or data stream 330. In other examples, a filter can perform one specific type of filtering; e.g., a second compression-related filter of filter(s) 322 can be used to compress input file or data stream 310 to generate filtered (compressed) output file or data stream 330 and a third compression-related filter of filter(s) 322 can be used to decompress input file or data stream 310 to generate filtered (decompressed) output file or data stream 330. Other examples of filters are possible as well.

Computer memory can be used in generating filtered output file or data stream 330. The computer memory can be stored in one or more memory buffers 324 and/or one or more memory caches 326. In some examples, buffer(s) 324 and/or cache(s) 326 can be implemented using system caches and/or system buffers, such as system cache(s) 212 and system buffer(s) 214. In other examples, buffer(s) 324 and/or cache(s) 326 can be implemented using memory allocated to filtering coordinator 330, which then can use the allocated memory as buffer(s) 324 and/or cache(s) 326; i.e., filtering coordinator 330 can perform memory management tasks as part of generating filtered output file or data stream 330.

In even other examples, filtered output file or data stream 330 can be stored in buffer(s) 324 and/or cache(s) 326. For example, input file or data stream 310 can be filtered using one of filters 322 and the filtered output can be stored in a contiguous buffer of buffer(s) 324 and information about input file or data stream 310, such as an identifier of input file or data stream 310 and/or filtered output size information, can be stored in cache(s) 326. Then, filtered output file or data stream 330 can be embodied as the contiguous buffer storing the filtered output and/or as a reference to the contiguous buffer.

Figure 4:
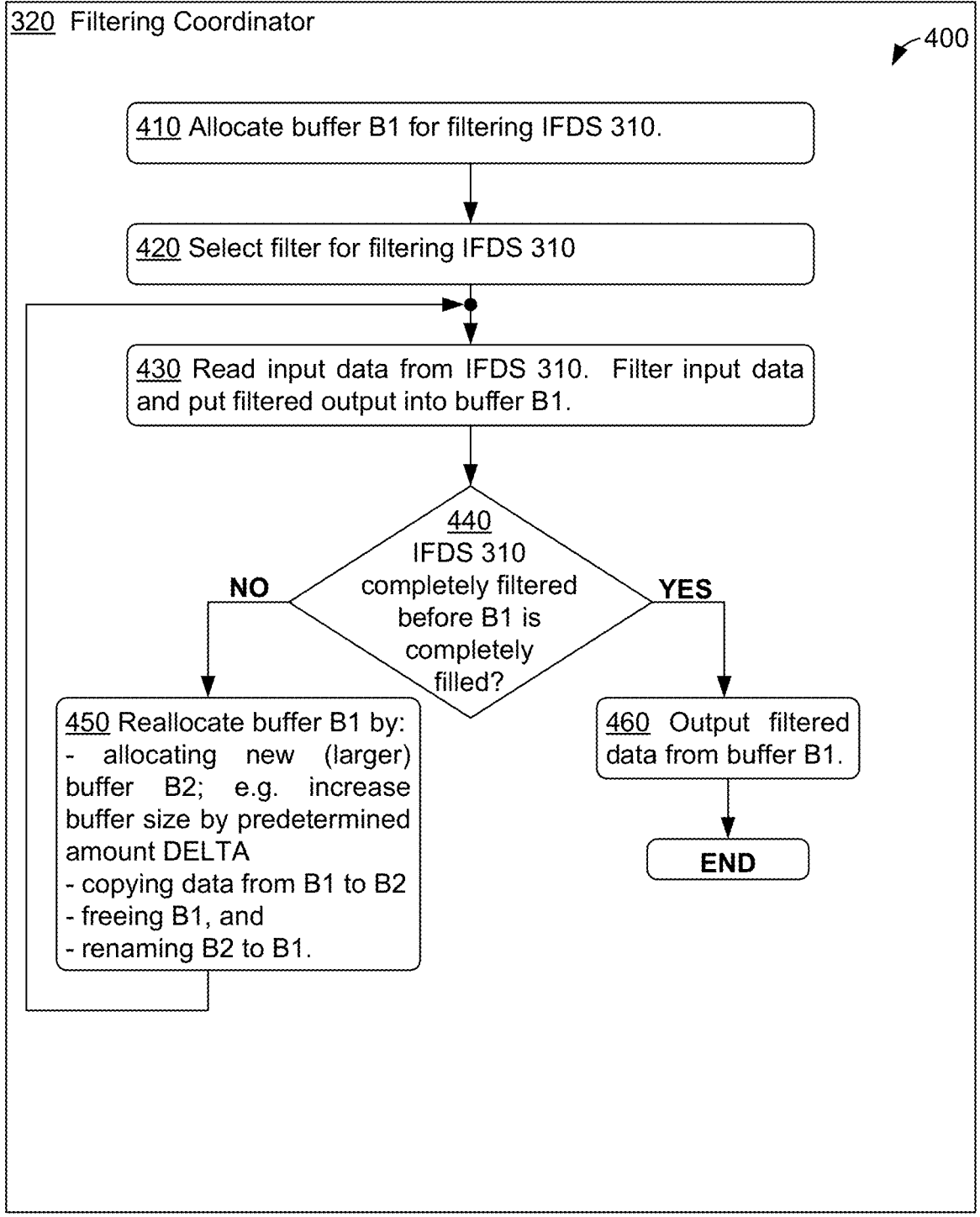
FIG. 4 shows a flowchart of a method executable by the filtering coordinator of FIG. 3, according to an example embodiment.

FIG. 4 shows a flowchart of method 400 executable by filtering coordinator 320, according to an example embodiment. Method 400 can be used to filter input data from an input data source, such as input file or data stream 310, to generate filtered output, such as filtered output file or data stream 330, that is stored in a memory buffer B1.

Method 400 can begin at block 410, where filtering coordinator 320, executing on filtering device 110, can allocate a buffer B1 of memory for filtering input data represented as input file or data stream 310.

Memory can be allocated in terms of memory units. For example, suppose the size of buffer B1 is initially allocated to have 2 memory units, where one memory unit can be a predetermined number of bits, bytes, words, double words, or other quantity of memory. More specifically, if a memory unit equals 16 kilobytes of memory, a 2 memory unit sized buffer B1 would have a size of 32 kilobytes.

At block 420, filtering coordinator 320 can select a filter from filter(s) 322 for filtering input file or data stream 310. In some examples, filtering coordinator 320 can be configured to perform one kind of filtering; e.g., decompressing input data. In these examples, block 420 can be omitted.

At block 430, filtering coordinator 320 can read input data from input file or data stream 310. Filtering coordinator 320 can then apply the filter selected at block 420 to the input file to generate filtered output, which can be stored in buffer B1.

At block 440, filtering coordinator 320 can determine whether input file or data stream 310 has been completely filtered before buffer B1 is completely filled. For example, filtering coordinator 320 can check an end of file, end of stream, or similar condition to determine whether input file or data stream 310 has been completely filtered, and filtering coordinator 320 can check an amount of free space in buffer B1 to determine whether buffer B1 has been completely filled—other techniques for determining whether input file or data stream 310 has been completely filtered and determining whether buffer B1 has been completely filled are possible as well. If filtering coordinator 320 determines that input file or data stream 310 has not been completely filtered before buffer B1 is completely filled, filtering coordinator 320 can proceed to block 450. Otherwise, filtering coordinator 320 determines that input file or data stream 310 has been completely filtered before buffer B1 is completely filled and filtering coordinator 320 can proceed to block 460.

At block 450, filtering coordinator 320 can reallocate buffer B1 to enlarge the size of the buffer and to enable continued filtering of input file or data stream 310. To reallocate buffer B1, filtering coordinator 320 can allocate a buffer B2 that is larger than buffer B1; buffer B2 can be larger than buffer B1 by a predetermined amount DELTA. For example, suppose the size of buffer B1 is 2 memory units, and DELTA is one memory unit, then the size of buffer B2 would be 3 memory units. Once buffer B2 has been allocated, filtered data stored in buffer B1 can be copied to buffer B2, memory for buffer B1 can be freed, and buffer B2 can be renamed as buffer B1. Upon completion of the procedures of block 450, filtering coordinator 320 can proceed to block 430. In some examples, renaming of buffer B2 as buffer B1 is an optional or omitted operation of block 450.

In other examples, buffer B2 can be a contiguous memory buffer, and the procedures of block 450 can involve reallocation using as contiguous memory buffer B2. For example, filtering coordinator 320 can allocate buffer B2 that is larger than buffer B1, where buffer B2 is a contiguous block of memory. Then, copying buffer B1 in to B2 can involve copying the second memory buffer into the contiguous block of memory that is buffer B2. Also, the contiguous block of memory that is buffer B2 can be renamed or otherwise designated at buffer B1.

At block 460, filtering coordinator 320 can provide the filtered output from buffer B1. In some examples, a buffer storing the filtered output (that is, buffer B1) can be the output of filtering coordinator 320; e.g., if the filtered output stored in buffer B1 is to be further processed by reading from buffer B1. In these examples, the filtered output can be buffer B1 itself, a copy of buffer B1, and/or a reference, such as a pointer or handle, to buffer B1. Once the procedures of block 460 have been completed, method 400 can be completed.

As discussed above, method 400 can filter input data and provide the filtered input data as an output in buffer B1. As indicated above in the context of block 450, method 400 may use reallocation, which can degrade performance of filtering coordinator 320. Thus, techniques that minimize or eliminate reallocation with respect to an amount of reallocation used by method 400 can increase performance of filtering coordinator 320.

Data caching can improve performance of filtering coordinator 320 with respect to time. For example, an input file or data stream that contains an object that is referenced repeatedly, as information about the object can be stored in the cache. However, in many examples, cache sizes limit an amount of information about the objects in input files or data streams that can be cached. To circumvent the limited amount of memory available in a cache is to store less data in a cache. For example, rather than storing an entire filtered object in a cache, a cache entry that includes a relatively-small amount of information about a filtered object can be stored instead. In some cases, the cache entry can include an identifier of the filtered object and a filtered size of the filtered object; in particular of these cases, the cache entry can include type information about the filtered object; e.g., information indicating the filtered object has a type such as an image type, text type, audio type, etc.

Figure 5:
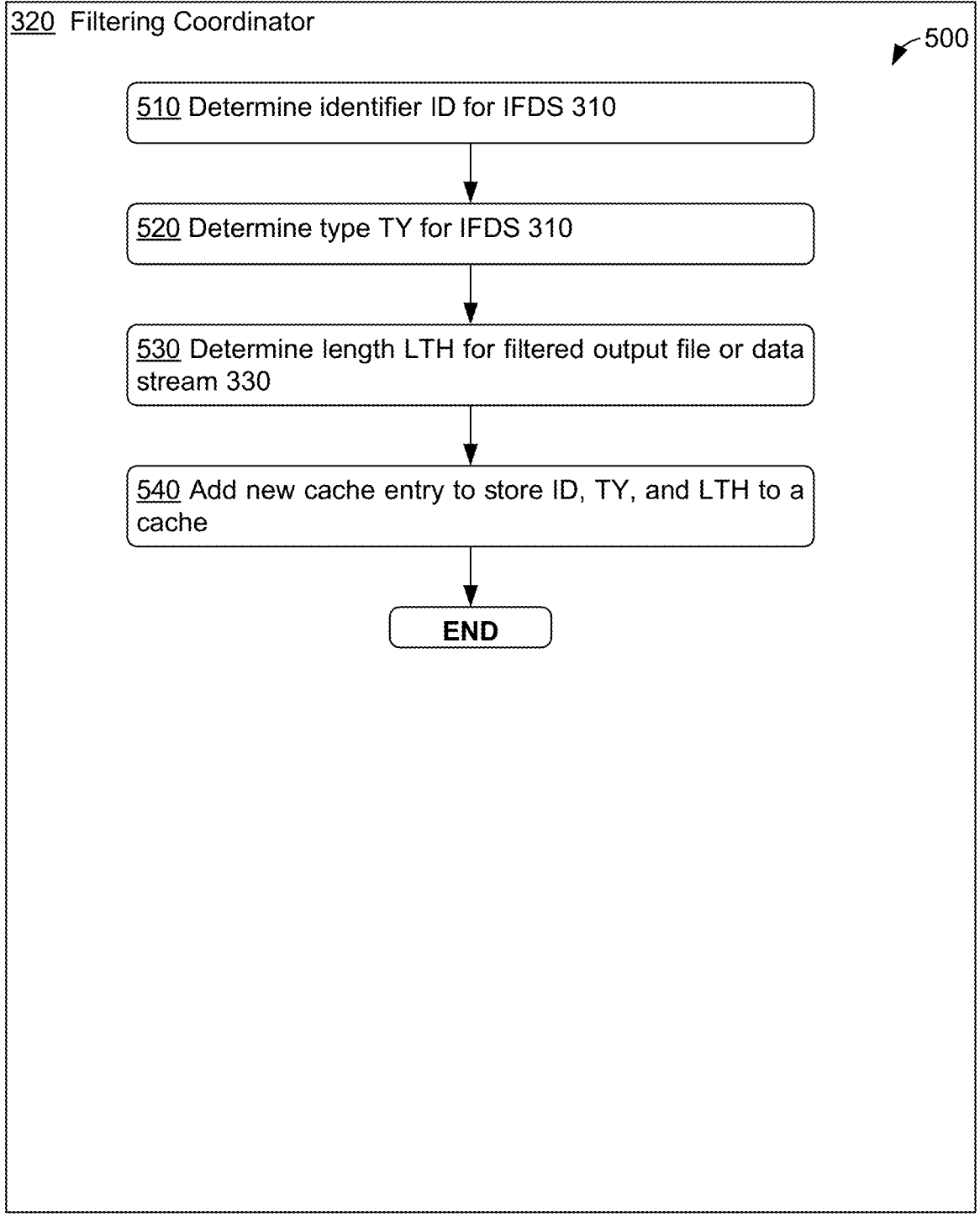
FIG. 5 shows a flowchart of another method executable by the filtering coordinator of FIG. 3, according to an example embodiment.

FIG. 5 shows a flowchart of method 500 executable by filtering coordinator 320, according to an example embodiment. Method 500 involves storage of cache entries about filtered objects in a cache to filter later-processed objects. In some examples, cache entries can be stored in non-cache memory; e.g., filtering coordinator 320 can maintain a list of cache entries outside of a cache. Method 500 can begin at block 510, where filtering coordinator 320, executing on filtering device 110, can determine an identifier ID associated with input data, such as input file or data stream 310.

At block 520, filtering coordinator 320 can determine a type TY associated with input file or data stream 310.

At block 530, filtering coordinator 320 can determine a size (or length) LTH associated with filtered output file or data stream 330.

At block 540, filtering coordinator 320 can add a cache entry to store ID, TY, and LTH in a cache. For example, an image named "Image12345" whose input size is 1 megabyte (MB) can be input as part of input file or data stream 310. Then, filtering coordinator 320 can filter the Image12345 image by decompressing the image into a buffer, where 2.3 MB of the buffer is used to store the decompressed Image12345 image. For this example, the cache entry can include an identifier ID of "Image12345", a type TY of "image" (or similar type), and a size LTH of "2.3 MB" (or equivalent value; e.g., "2411724 bytes").

To add the cache entry, filtering coordinator 320 can create a cache entry that stores values of ID, TY, and LTH, and then store the cache entry in the cache. In some examples, more, less, and/or different information than ID, TY, and LTH information can be part of the cache entry; e.g., an input file or data stream size can be added, a type can be omitted, etc. In some examples, the cache can be a system cache; in other examples, the cache can be memory administered by filtering coordinator 320.

Method 500 can reduce the amount of memory requested and reduces the time spent on processing input data. However, one potential downside is that data cache entries may be deleted, as the cache can be used as part of other processing in the interim. Then, a cache entry containing a particular input file or data stream's length may not be available at the time the particular input file or data stream is being filtered. To resolve this potential problem, method 600 can keep track of the maximum buffer size requested so far and use the maximum buffer size as an initial estimate in allocating buffer memory while filtering input data. Another option, described in the context of method 700, is to use the last used memory buffer size as an initial estimate in allocating buffer memory while filtering input data.

Figure 6:
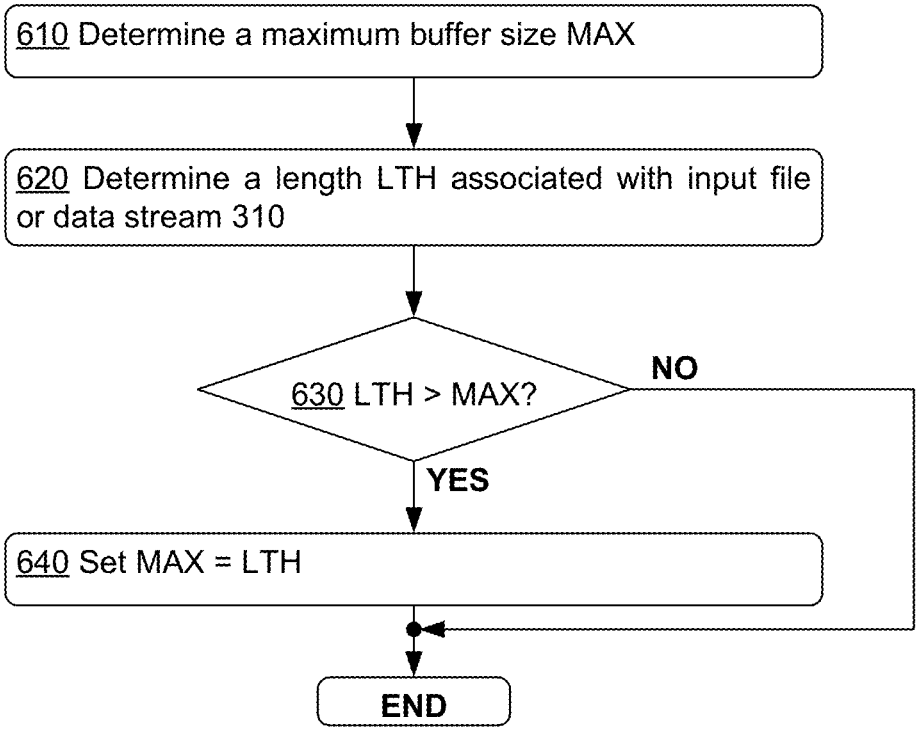
FIG. 6 shows a flowchart of yet another method executable by the filtering coordinator of FIG. 3, according to an example embodiment.

FIG. 6 shows a flowchart of method 600 executable by filtering coordinator 320, according to an example embodiment. Method 600 involves determining a maximum data size MAX for buffer allocation. Method 600 can begin at block 610, where filtering coordinator 320, executing on filtering device 110, can determine an initial value of maximum buffer size value MAX. For example, MAX can be initialized to 0 or another predetermined value or can be set to a value during a prior execution of method 600.

At block 620, filtering coordinator 320 can determine a length LTH associated with input file or data stream 310. For example, LTH can be a size of filtered input data from input file or data stream 310 (e.g., a size of filtered input file or data stream 330) or a size of input data in input file or data stream 310.

At block 630, filtering coordinator 320 can determine whether LTH is greater than MAX. If LTH is greater than MAX, filtering coordinator 320 can proceed to block 640. If LTH is not greater than MAX, method 600 can be completed.

At block 640, filtering coordinator 320 can set MAX equal to the value of LTH. Upon completion of block 640, method 600 can be completed.

FIG. 7 shows a flowchart of method 700 executable by filtering coordinator 320, according to an example embodiment. Method 700 involves determining a last used buffer size LAST for buffer allocation. Method 700 can begin at block 710, where filtering coordinator 320, executing on filtering device 110, can determine an initial value for last used buffer size LAST. The value of LAST can be initialized to 0.

At block 720, filtering coordinator 320 can determine a length LTH associated with input file or data stream 310. For example, LTH can be a size of filtered input data from input file or data stream 310 (e.g., a size of filtered input file or data stream 330) or a size of input data in input file or data stream 310.

At block 730, filtering coordinator 320 can determine whether LTH is greater than LAST. If LTH is greater than LAST, filtering coordinator 320 can proceed to block 740. If LTH is not greater than LAST, method 700 can be completed.

At block 740, filtering coordinator 320 can set LAST equal to the value of LTH, and method 700 can then be completed. In some examples, the comparison at block 730 can be omitted; that is, LAST can always be set to the value of LTH. If the comparison at block 730 is performed, LAST can have a monotonically increasing value. However, LAST may not have a monotonically increasing value if the comparison at block 730 is omitted. Upon completion of block 740, method 700 can be completed.

Use of either the MAX value of method 600 or the LAST value of method 700 to allocate a buffer can lead to allocating more memory to the buffer than necessary. If a buffer does contain excess memory, an alternative is to "shrink" the buffer. A shrink operation can maintain the data stored in the buffer without moving the data and can free excess memory from the buffer.

FIG. 8 shows a flowchart of method 800 executable by filtering coordinator 320, according to an example embodiment. Method 800 involves determining whether a memory buffer B1 storing information of filtered input file or data stream 310 (e.g., information in filtered output file or data stream 330) is to be shrunk. Then, if buffer B1 is to be shrunk, method 800 involves shrinking buffer B1. In describing method 800, buffer B1 is assumed to be allocated a number of memory units of memory and the values of the herein-described SHRINK, LTH, ALLOC, and DIFF variables are expressed in terms of memory units, where memory units are discussed above in the context of block 410 of method 400 and FIG. 4.

Method 800 can begin at block 810, where filtering coordinator 320, executing on filtering device 110, can determine a minimum-memory-shrinkage value SHRINK. SHRINK can be a pre-determined value and/or can be determined based on a MAX value, a LAST value, or another value; e.g., SHRINK can be set to be a fixed value of memory units, a percentage of MAX or LAST, or another value of memory units.

At block 820, filtering coordinator 320 can determine a length LTH associated with input file or data stream 310. For example, LTH can be a size of filtered input data from input file or data stream 310 (e.g., a size of filtered input file or data stream 330) or a size of input data in input file or data stream 310.

At block 830, filtering coordinator 320 can determine an allocated memory buffer size ALLOC for buffer B1 storing data of filtered input file or data stream 310. For example, ALLOC can equal an amount of memory used to store filtered output file or data stream 330. Note that ALLOC can differ from an amount of memory allocated to buffer B1. For example, if filtered output file or data stream 330 takes 20 units of memory to be stored, and buffer B1 has been allocated 30 memory units, then ALLOC would be 20 memory units.

At block 840, filtering coordinator 320 can determine a difference value DIFF=ALLOC−LTH. The difference value DIFF can indicate how much memory in buffer B1 is unused. Continuing the example of block 830, DIFF can be equal to ALLOC−LTH=30 memory units−20 memory units=10 memory units.

At block 850, filtering coordinator 320 can determine whether DIFF is greater than SHRINK. If DIFF is greater than SHRINK, then filtering coordinator 320 can proceed to block 860. If DIFF is not greater than SHRINK, method 800 can be completed. Continuing the example of blocks 830 and 840, let SHRINK be set to a pre-determined value of three (representing two memory units), then DIFF=10 memory units is greater than SHRINK=3 memory units, and so filtering coordinator 320 can proceed to block 860.

At block 860, filtering coordinator 320 can free at least some of the unused memory in buffer B1. For example, filtering coordinator 320 can free SHRINK memory units, DIFF memory units, or some other amount of memory from buffer B1. However, freeing more than DIFF memory units can lead to freeing memory from buffer B1 that stores filtered input data from input file or data stream 310. Freeing at least some of the unused memory in buffer B1 can involve reallocating memory from buffer B1 to a free memory pool, thereby adding memory to the free memory pool. Continuing the example of blocks 830, 840, and 850, any amount of memory between zero and 10 (=DIFF) memory units can be freed from buffer B1 without freeing memory from buffer B1 that stores filtered input data from input file or data stream 310. Upon completion of block 860, method 800 can be completed.

In some examples, an iterative process can be used to free memory from buffer B1. Continuing the above example, an iteration of freeing memory can free SHRINK=3 memory units from buffer B1, and the iterative process can continue until less than SHRINK memory units are unused by buffer B1. That is, initially 10 memory units would be unused from buffer B1, but after three iterations of the iterative process freeing three memory units per iteration, one memory unit would remain unused from buffer B1. As one is less than SHRINK (=3), the remaining unused memory unit would be retained by buffer B1 at the end of the iterative process.

Figure 9:
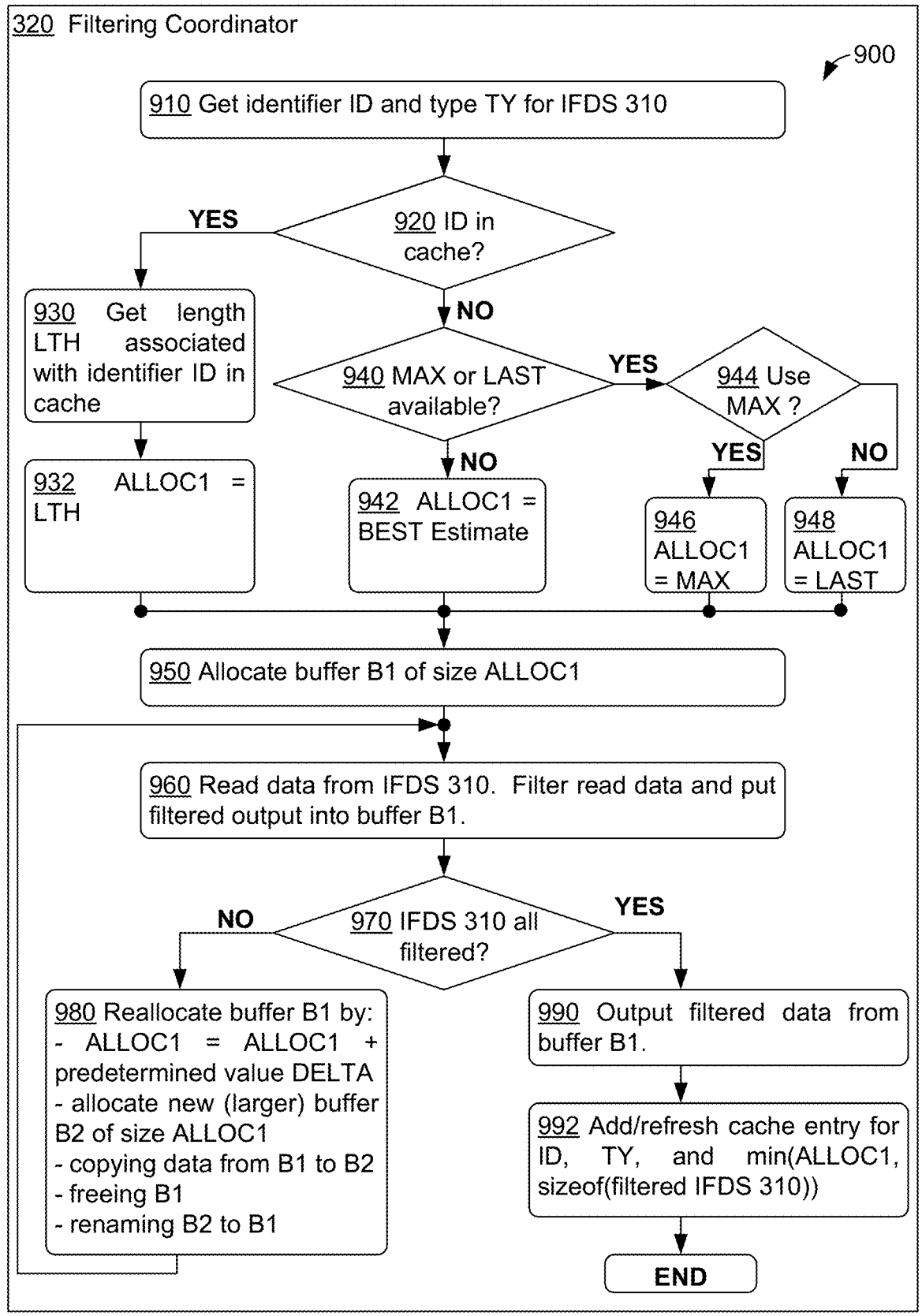
FIG. 9 shows a flowchart of a further method executable by the filtering coordinator of FIG. 3, according to an example embodiment.

FIG. 9 shows a flowchart of method 900 executable by filtering coordinator 320, according to an example embodiment. Method 900 utilizes concepts described in the context of methods 400, 500, 600, 700, and 800 to filter input data from an input data source, such as input file or data stream 310, to generate filtered output, such as filtered output file or data stream 330, that is stored in a memory buffer B1. Throughout the description of method 900, memory is allocated in terms of memory units, where memory units are described above in the context of block 410 of method 400 and FIG. 4.

Method 900 can begin at block 910, where filtering coordinator 320, executing on filtering device 110, can determine an identifier ID and a type TY for an input data source; e.g., input file or data stream 310. For example, the identifier ID and type TY can be included in a reference to a data object that is part of input file or data stream 310, and so filtering coordinator 320 can determine identifier ID and type TY from the reference. As another example, identifier ID and type TY can be provided as input parameters to filtering coordinator when invoking computer software that implements method 900. In some examples, filtering coordinator 320 does not determine type TY; that is, only identifier ID is determined in these examples. In other examples, filtering coordinator determines additional information to identifier ID and type TY at block 910.

At block 920, filtering coordinator 320 can determine whether a cache stores a cache entry that can be identified by identifier ID. For example, filtering coordinator 320 can perform a search, key lookup, or query for a cache entry whose key includes identifier ID, and if a cache entry is found (or is not found), determine that the cache does (or does not) store a cache entry that can be identified by identifier ID If filtering coordinator 320 determines that the cache stores a cache entry that can be identified by identifier ID, filtering coordinator can proceed to block 930; otherwise, filtering coordinator 320 can determine that the cache does not store a cache entry that can be identified by identifier ID and proceed to block 940.

At block 930, filtering coordinator 320 can get a length LTH from the cache entry identified by identifier ID mentioned in the context of block 920.

At block 932, filtering coordinator 320 can set a value of a buffer allocation size ALLOC1 equal to the value LTH determined at block 930. Upon completion of block 932, filtering coordinator 320 can proceed to block 950

At block 940, filtering coordinator 320 can determine whether a value for a maximum data size MAX or a value for a last used buffer size LAST usable for buffer allocation is available. If neither LAST nor MAX is available for buffer allocation, filtering coordinator 320 can proceed to block 942. Otherwise, a value of either LAST or MAX is available for buffer allocation, and filtering coordinator 320 can proceed to block 944.

At block 942, filtering coordinator 320 can use a value for a best estimate BEST for buffer allocation. BEST can be a predetermined value, a value based on a size of input file or data stream 310, a data based on previously filtered data objects, or some other estimate of a buffer size for buffer allocation expressed in terms of memory units. After determining the value of best estimate BEST, filtering coordinator 320 can set a value of buffer allocation size ALLOC1 equal to the value of BEST. Upon completion of block 942, filtering coordinator 320 can proceed to block 950

At block 944, filtering coordinator 320 can determine whether the value of MAX is to be used for buffer allocation. If the value of MAX is to be used for buffer allocation, filtering coordinator 320 can proceed to block 946; else filtering coordinator 320 can proceed to block 948.

At block 946, filtering coordinator 320 can set a value of buffer allocation size ALLOC1 equal to the value of MAX. Upon completion of block 946, filtering coordinator 320 can proceed to block 950

At block 948, filtering coordinator 320 can set a value of buffer allocation size ALLOC1 equal to the value of LAST.

At block 950, filtering coordinator 320 can allocate a buffer B1 of memory of size ALLOC1 for filtering input data represented as input file or data stream 310.

At block 960, filtering coordinator 320 can select a filter from filter(s) 322 for filtering input file or data stream 310. In some examples, filtering coordinator 320 can be configured to perform one kind of filtering; e.g., decompressing input data. In these examples, block 920 can be omitted. Then, after selecting the filter as necessary, filtering coordinator 320 can read input data from input file or data stream 310. Filtering coordinator 320 can then apply the filter selected at block 920 to the input file to generate filtered output, which can be stored in buffer B1.

At block 970, filtering coordinator 320 can determine whether input file or data stream 310 has been completely filtered before buffer B1 is completely filled. Determining whether input file or data stream 310 has been completely filtered before buffer B1 is completely filled is discussed above in more detail in the context of block 440 of method 400 and FIG. 4. If filtering coordinator 320 determines that input file or data stream 310 has not been completely filtered before buffer B1 is completely filled, filtering coordinator 320 can proceed to block 980. Otherwise, filtering coordinator 320 determines that input file or data stream 310 has been completely filtered before buffer B1 is completely filled and filtering coordinator 320 can proceed to block 990.

At block 980, filtering coordinator 320 can reallocate buffer B1 to enlarge the size of the buffer and to enable continued filtering of input file or data stream 310. To reallocate buffer B1, filtering coordinator 320 can allocate a buffer B2 that is larger than buffer B1. For example, buffer B2 can be larger than buffer B1 by a predetermined amount DELTA. For example, suppose the size of buffer B1 is 2 memory units, where one memory unit can be a predetermined number of bits, bytes, words, double words, or other quantity of memory, and that DELTA is one memory unit, then the size of buffer B2 would be 3 memory units. Once buffer B2 has been allocated, filtered data stored in buffer B1 can be copied to buffer B2, memory for buffer B1 can be freed, and buffer B2 can be renamed as buffer B1. In some examples, buffer B2 can be a contiguous memory buffer; then, the procedures of block 980 can involve reallocation using as contiguous memory buffer B2, such as discussed above in the context of block 450.

Upon completion of the procedures of block 980, filtering coordinator 320 can proceed to block 960. In some examples, renaming of buffer B2 as buffer B1 is an optional or omitted operation of block 980.

At block 990, filtering coordinator 320 can provide the filtered output from buffer B1. In some examples, a buffer storing the filtered output (that is, buffer B1) can be the output of filtering coordinator 320; e.g., if the filtered output stored in buffer B1 is to be further processed by reading from buffer B1. In these examples, the filtered output can be buffer B1 itself, a copy of buffer B1, and/or a reference, such as a pointer or handle, to buffer B1.

At block 992, filtering coordinator 320 can add a cache entry to store ID, TY, and LTH in a cache. To add the cache entry, filtering coordinator 320 can create a cache entry that stores values of ID, TY, and LTH, and then store the cache entry in the cache. In some examples, more, less, and/or different information than ID, TY, and LTH information can be part of the cache entry; e.g, an input file or data stream size can be added, a type can be omitted, etc. In some examples, the cache can be a system cache; in other examples, the cache can be memory administered by filtering coordinator 320. In some cases, the cache can already store a cache entry with ID, TY, and LTH. In these cases, at block 992, the cache entry with ID, TY, and LTH can be refreshed, or marked as used at the current time, so that a cache replacement algorithm is less likely to remove the cache entry. For example, if a least-recently-used cache replacement algorithm is used to administer the cache, then refreshing the cache entry can make the cache entry be considered to be the most-recently-used cache entry, and thus reduce the likelihood that the cache replacement algorithm will replace the cache entry.

Once the procedures of block 992 have been completed, method 900 can be completed.

Figure 10:
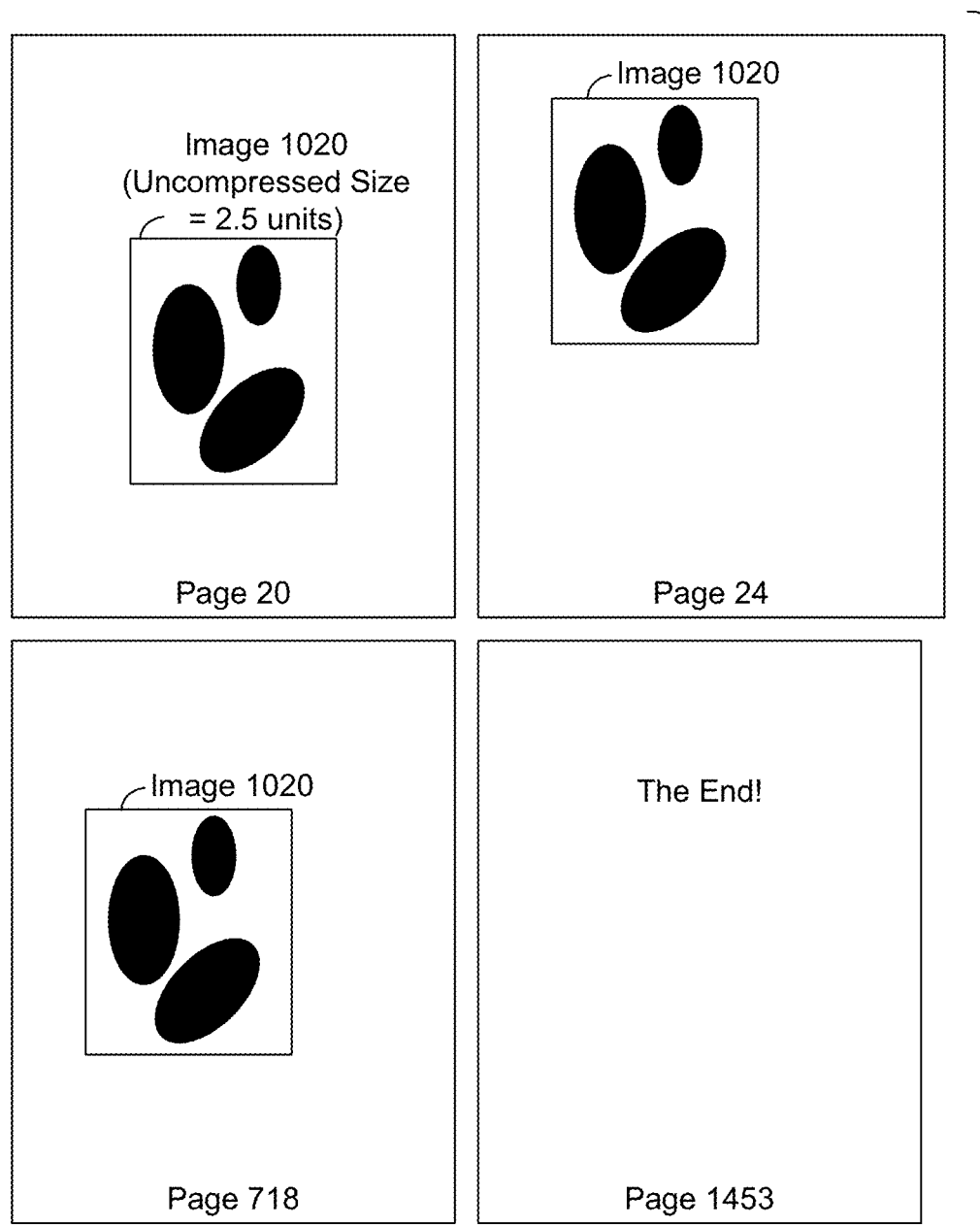
FIG. 10 shows an example book to be filtered during a scenario, according to an example embodiment.
Figure 11:
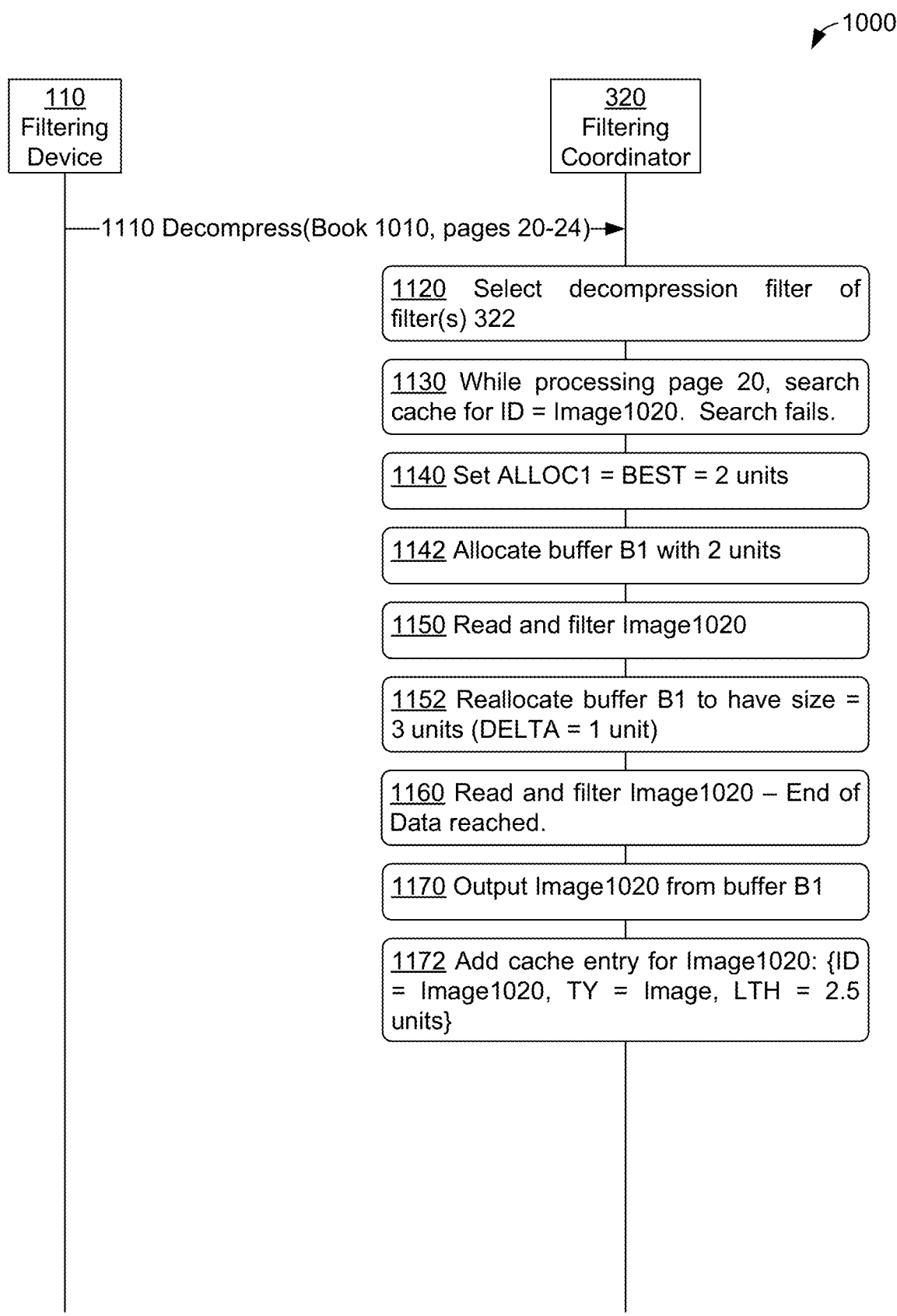
FIGS. 11, 12, and 13 show example communications during the scenario of FIG. 10, according to an example embodiment.
Figure 12:
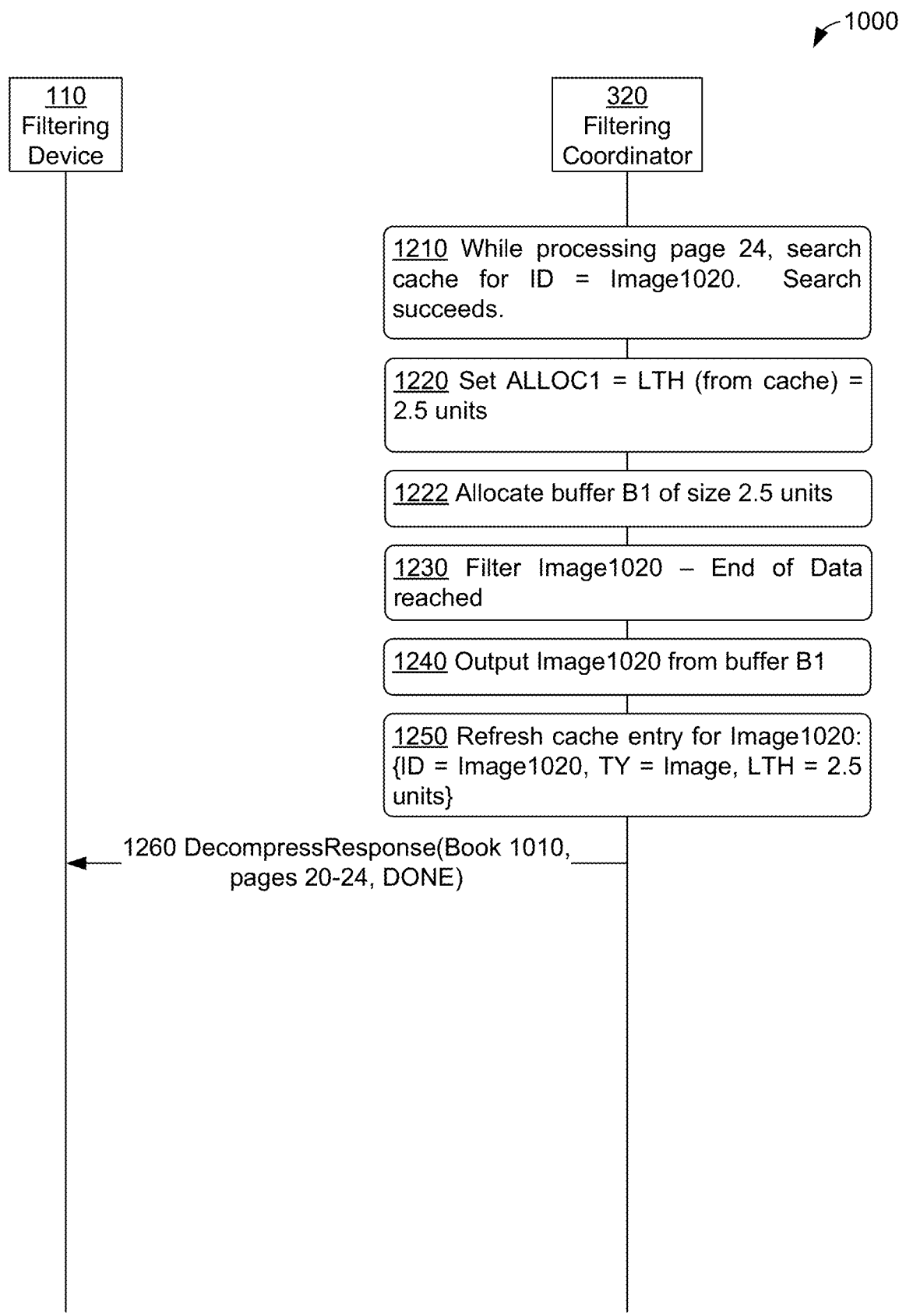

FIG. 10 shows an example book 1010 to be filtered during scenario 1000, according to an example embodiment. In scenario 1000, an electronic copy of book 1010 is received as an input file at filtering device 110 along with instruction to apply a decompression filter to pages 20-24 of book 1010. After receiving the instruction to apply a decompression filter to pages 20-24 of book 1010, filtering coordinator 320 uses the techniques of method 900 apply the decompression filter to pages 20-24 of book 1010 as illustrated in FIGS. 11 and 12. FIG. 11 shows that, while applying the decompression filter to page 20, filtering coordinator 320 searches a cache for a cache entry related to image 1020. At this stage of scenario 1000, this search fails and so filtering coordinator 320 uses a best estimate to determine an initial amount of memory for a buffer that stores a filtered (decompressed) copy of image 1020. After subsequent reallocation, image 1020 is filtered. After image 1020 has been filtered, filtering coordinator 320 adds a cache entry to refer to image 1020 that includes the filtered (decompressed) size of image 1020.

FIG. 12 shows that, while filtering page 24, filtering coordinator 320 detects the reference to image 1020 and searches the cache for a cache entry related to image 1020. At this stage of scenario 1000, filtering coordinator locates the cache entry for image 1020 previously stored while filtering page 20. Then, filtering coordinator 320 uses the filtered (decompressed) size of image 1020 stored with the cache entry for image 1020 to allocate memory for a buffer that stores another filtered (decompressed) copy of image 1020. After filtering (decompressing) image 1020 for page 24 of book 1010, filtering coordinator 320 informs filtering device 110 that pages 20-24 of book 1010 have been filtered (decompressed).

Figure 13:
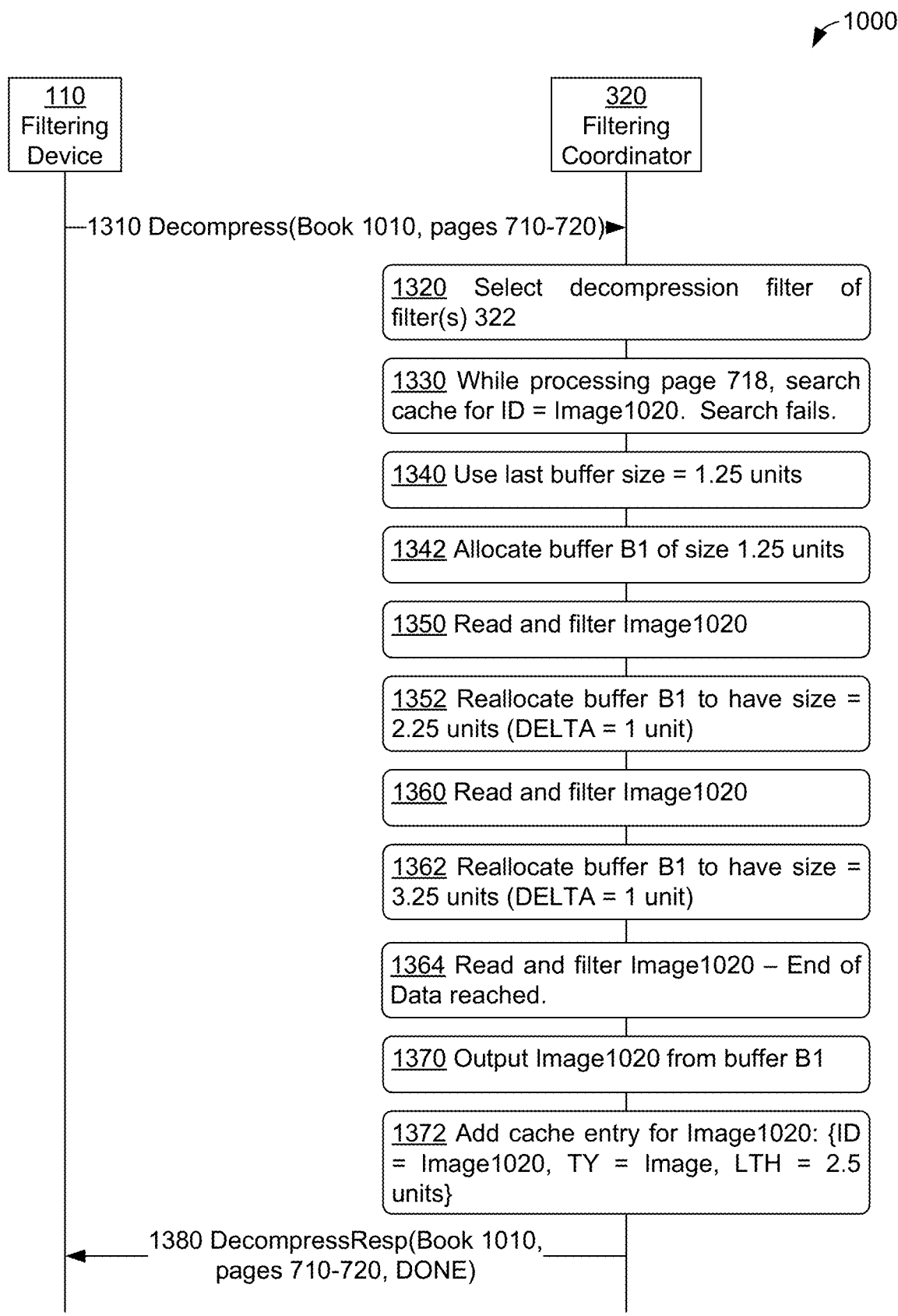

As shown in FIG. 13, scenario 1000 continues with filtering device 110 receiving an instruction to apply a decompression filter to pages 710-720 of book 1010. After receiving this instruction, filtering coordinator 320 uses the techniques of method 900 apply the decompression filter to pages 710-720 of book 1010. While applying the decompression filter to page 718, filtering coordinator 320 detects the reference to image 1020 and searches a cache for a cache entry related to image 1020. At this stage of scenario 1000, this search fails and so filtering coordinator 320 uses a last used buffer size as an estimate to determine an initial amount of memory for a buffer that stores a filtered (decompressed) copy of image 1020. After subsequent reallocation, filtering coordinator 320 completes the filtering (decompression) of image 1020. Once image 1020 has been filtered, filtering coordinator 320 can add a cache entry to refer to image 1020 that includes the filtered (decompressed) size of image 1020. Then, after filtering all of pages 710-720 of book 1010, filtering coordinator 320 informs filtering device 110 that pages 710-720 of book 1010 have been filtered (decompressed) to complete scenario 1000.

Turning to FIG. 11, scenario 1000 begins with filtering device 110 receiving a copy of book 1010 as an input file at filtering device 110 as part of a filtering request by decompress book 1010. Book 1010 has 1,453 pages, including pages 20, 24, 718, and 1,453 which are shown in FIG. 10. Each of pages 20, 24, and 718 of book 1010 has a copy of image 1020, while page 1,453 does not have a copy of image 1020. The electronic copy of book 1010 stores one copy of image 1020 with the remainder of page 20 and includes at least two respective references to image 1020 for respective pages 24 and 718. The uncompressed size of image 1020 is 2.5 memory units.

FIG. 11 shows scenario 1000 continuing with filtering device 110 sending decompression message 1110 to filtering coordinator 320 as a request to decompress "pages 20-24" of the input "Book 1010". Upon reception of decompression message 1110, filtering coordinator 320 carries out the procedures of method 900 to filter book 1010. In scenario 1000, the procedures of method 900 to filter/decompress pages 20-24 of book 1010 include carrying out the procedures of blocks 1120, 1130, 1140, 1142, 1150, 1152, 1160, 1170, 1172, 1210, 1220, 1222, 1230, 1240, and 1250.

At block 1120, filtering coordinator 320 selects a decompression filter of filters 322 to decompress book 1010. A decompression filter is selected as decompression message 1110 is a request to decompress part of the input file book 1010.

At block 1130, filtering coordinator 320 continues to decompress page 20 of book 1010. During decompression of page 20, filtering coordinator 320 detects a reference to image 1020 whose identifier is "Image1020" and whose type is "Image". The reference to image 1020 does not have a decompressed size, so filtering coordinator 320 searches a cache for a cache entry with an identifier of "Image1020". At this stage of scenario 1000, the search of the cache fails.

At block 1140, filtering coordinator 320 uses a best estimate BEST to estimate memory allocation for a buffer B1 that will be used to store a decompressed copy of image 1020. The best estimate BEST indicates that the size of buffer B1 is 2 memory units. Then, the value of the ALLOC1 variable of method 900 is set to the value of BEST.

At block 1142, filtering coordinator 320 allocates buffer B1 to have a size of 2 memory units.

At block 1150, filtering coordinator 320 reads and filters/decompresses image 1020 and stores the filtered/decompressed output in buffer B1. While filtering image 1020, buffer B1 becomes full before image 1020 has been completely filtered.

At block 1152, filtering coordinator 320 reallocates buffer B1. In scenario 1000, the DELTA variable in method 900 is set to 1 memory unit. To reallocate buffer B1, filtering coordinator sets ALLOC1=2 (its previous value)+1 (the value of DELTA)=3 memory units. Filtering coordinator then carries out the remainder of the reallocation techniques described in the context of block 980 of method 900 to reallocate buffer B1 to have a size of ALLOC1=3 memory units.

At block 1160, filtering coordinator 320 continues to filter/decompress image 1020 and reaches an end of data for image 1020 before completely filling (reallocated) buffer B1, which stores 2.5 memory units of filtered/decompressed data of image 1020.

At block 1170, filtering coordinator 320 outputs buffer B1. In scenario 1000, the outputted buffer B1 is used in printing a copy of page 20 on paper.

At block 1172, filtering coordinator 320 generates a new cache entry for image 1020. The cache identifier has an identifier ID="Image1020", a type TY="Image", and a length LTH=2.5 memory units. As indicated by block 992 of method 900, SZ is determined to be a minimum of ALLOC1 and a size of filtered image 1020, where ALLOC1=3 memory units and the size of filtered image 1020=2.5 memory units. In some scenarios, as buffer B1 is allocated with 3 memory units, but only 2.5 of those memory units are occupied with data from image 1020, up to 0.5 memory units of buffer B1 can be freed using the memory shrinking techniques of method 800.

Turning to FIG. 12, at block 1210, filtering coordinator 320 continues filtering/decompressing pages 20-24 of book 1010 using the techniques of method 900. During decompression of page 24, filtering coordinator 320 detects a reference to image 1020 whose identifier is "Image1020" and whose type is "Image". The reference to image 1020 does not have a decompressed size, so filtering coordinator 320 searches a cache for a cache entry with an identifier of "Image1020" to find the cache entry added at block 1172. As indicated above in the context of block 1172, the cache entry stores a value of LTH=2.5 memory units.

At block 1220, as the search of the cache succeeded, filtering coordinator 320 can set a value of the ALLOC1 variable equal to LTH, which in turn equals 2.5 memory units.

At block 1222, filtering coordinator 320 allocates buffer B1 to have a size of 2.5 memory units.

At block 1230, filtering coordinator 320 filters/decompresses image 1020 and reaches an end of data for image 1020 before completely filling buffer B1, which stores 2.5 memory units of filtered/decompressed data of image 1020.

At block 1240, filtering coordinator 320 outputs buffer B1. In scenario 1000, the outputted buffer B1 is used in printing a copy of page 24 on paper.

At block 1250, filtering coordinator 320 refreshes the cache entry for identifier ID="Image1020", a type TY="Image", and a length LTH=2.5 memory units.

Upon completion of the procedures of block 1250, filtering coordinator 320 sends "DecompressResponse" message 1260 as response to decompress message 1110. DecompressResponse message 1260 informs filtering device 110 that decompression of "pages 20-24" of "Book 1010" is "DONE".

In scenario 1000, decompression of pages 20-24 of book 1010 is performed as part of a process to print paper copies of pages 20-24 of book 1010. As indicated above, filtering device 110 proceeds with printing paper copies of pages 20-24 of book 1010 using the filtered/decompressed data of image 1020. In other scenarios, filtering device 110 can perform, but is not limited to performing one or more of the following actions (perhaps in addition to printing paper copies of pages 20-24 of book 1010): display part or all of decompressed pages 20-24 of book 1010, communicate decompressed pages 20-24 of book 1010 to another computing device, store decompressed pages 20-24 of book 1010 in a document box or other storage location, and generate a display (e.g., an information dialog or message) providing information that decompressed pages 20-24 of book 1010 are available.

Turning to FIG. 13, scenario 1000 continues with filtering device 110 sending decompression message 1310 to filtering coordinator 320 as a request to decompress "pages 710-720" of the input "Book 1010". Upon reception of decompression message 1310, filtering coordinator 320 carries out the procedures of method 900 to filter book 1010. In scenario 1000, the procedures of method 900 to filter/decompress pages 20-24 of book 1010 include carrying out the procedures of blocks 1320, 1330, 1340, 1342, 1350, 1352, 1360, 1362, 1364, 1370, and 1372.

At block 1320, filtering coordinator 320 selects a decompression filter of filters 322 to decompress book 1010. A decompression filter is selected as decompression message 1110 is a request to decompress part of the input file book 1010.

At block 1330, filtering coordinator 320 decompresses pages 710-717 of book 1010. During decompression of page 718, filtering coordinator 320 detects a reference to image 1020 whose identifier is "Image1020" and whose type is "Image". The reference to image 1020 does not have a decompressed size, so filtering coordinator 320 searches a cache for a cache entry with an identifier of "Image1020". At this stage of scenario 1000, the search of the cache fails, as the cache entry inserted at block 1172 and refreshed at block 1250 has since been replaced by other data.

At block 1340, filtering coordinator 320 uses a last used buffer size LAST as an estimate in allocating memory to buffer B1 that will be used to store a decompressed copy of image 1020. The last used buffer size LAST indicates that the size of buffer B1 is 1.25 memory units. Then, the value of the ALLOC1 variable of method 900 is set to the value of LAST.

At block 1342, filtering coordinator 320 allocates buffer B1 to have a size of 1.25 memory unit.

At block 1350, filtering coordinator 320 reads and filters/decompresses image 1020 and stores the filtered/decompressed output in buffer B1. While filtering image 1020, buffer B1 becomes full before image 1020 has been completely filtered.

At block 1352, filtering coordinator 320 reallocates buffer B1. To reallocate buffer B1, filtering coordinator sets ALLOC1=1.25 (its previous value)+1 (the value of DELTA)=2.25 memory units. Filtering coordinator then carries out the remainder of the reallocation techniques described in the context of block 980 of method 900 to reallocate buffer B1 to have a size of ALLOC1=2.25 memory units.

At block 1360, filtering coordinator 320 continues filtering/decompressing image 1020 and stores the filtered/decompressed output in buffer B1. While filtering image 1020, buffer B1 becomes full again before image 1020 has been completely filtered.

At block 1362, filtering coordinator 320 reallocates buffer B1. To reallocate buffer B1, filtering coordinator sets ALLOC1=2.25 (its previous value)+1 (the value of DELTA)=3.25 memory units. Filtering coordinator then carries out the remainder of the reallocation techniques described in the context of block 980 of method 900 to reallocate buffer B1 to have a size of ALLOC1=3.25 memory units.

At block 1364, filtering coordinator 320 continues to filter/decompress image 1020 and reaches an end of data for image 1020 before completely filling (reallocated) buffer B1, which stores 2.5 memory units of filtered/decompressed data of image 1020.

At block 1370, filtering coordinator 320 outputs buffer B1. In scenario 1000, the outputted buffer B1 is used in printing a copy of page 718 on paper.

At block 1372, filtering coordinator 320 generates a new cache entry for image 1020. The cache identifier has an identifier ID="Image1020", a type TY="Image", and a length LTH=2.5 memory units. As indicated by block 992 of method 900, SZ is determined to be a minimum of ALLOC1 and a size of filtered image 1020, where ALLOC1=3.25 memory units and the size of filtered image 1020=2.5 memory units. In some scenarios, as buffer B1 is allocated with 3.25 memory units, but only 2.5 of those memory units are occupied with data from image 1020, up to 0.75 memory units of buffer B1 can be freed using the memory shrinking techniques of method 800.

In scenario 1000, decompression of pages 710-720 of book 1010 is performed as part of a process to print paper copies of pages 710-720 of book 1010. Then, after receiving DecompressResponse message 1380, filtering device 110 can proceed with printing paper copies of pages 710-720 of book 1010. In other scenarios, after receiving DecompressResponse message 1380, filtering device 110 can perform, but is not limited to performing one or more of the actions described above in the context of DecompressResponse message 1260.

After printing paper copies of pages 710-720 of book 1010, scenario 1000 can be completed.

Example Methods of Operation

FIG. 14 shows a flowchart for method 1400, according to an example embodiment. Method 1400 can be carried out by a computing device, such as computing device 200. Method 1400 can begin at block 1410, where the computing device can receive an input data object to be filtered by the computing device, as discussed above at least in the context of FIGS. 3, 4, 9, and 11-13.

At block 1420, the computing device can determine whether the input data object has been previously filtered by the computing device, as discussed above at least in the context of FIGS. 9 and 11-13.

In some embodiments, the computing device can include a cache of memory; then, determining whether the input data object has been previously filtered can include determining whether the input data object has been previously filtered based on data stored in the cache, as discussed above at least in the context of FIGS. 3, 9, and 11-13. In particular of these embodiments, the data stored in the cache can include one or more cache entries related to previously filtered data objects, and where a cache entry of the one or more cache entries includes: an identifier of a previously filtered data object, and an unfiltered data size for the previously filtered data object, as discussed above at least in the context of FIGS. 5, 9, and 11-13. In more particular of these embodiments, the cache entry can further include a type of the previously filtered data object, as discussed above at least in the context of FIGS. 5, 9, and 11-13.

At block 1430, the computing device can, after determining that the input data object has been previously filtered: determine a previously filtered data size for the input data object, allocate a memory buffer to store a filtered version of the input data object based on the previously filtered data size, and filtering the input data object using the memory buffer, as discussed above at least in the context of FIGS. 9 and 12. In some embodiments, receiving the input data object to be filtered can include receiving an input data object to be decompressed, and where filtering the input data object using the memory buffer includes decompressing the input data object using the memory buffer, as discussed above at least in the context of FIGS. 3, 4, 9, and 10-13.

At block 1440, the computing device can generate an output of the computing device that is based on the filtered data object, as discussed above at least in the context of FIGS. 3, 4, 9, and 11-13. In some embodiments, the computing device is associated with a printer; then, the output of the computing device can be at least one of: one or more printed pages that are based on the filtered data object, a display based on the filtered data object, and an electronic file that is based on the filtered data object, as discussed above at least in the context of FIG. 3.

In some embodiments, method 1400 can further include: after determining that the input data object has not been previously filtered by the computing device, determining an estimated size of the input data object; allocating a second memory buffer having a first size to store an unfiltered version of the input data object, where the first size that is based on the estimated size of the input data object; and filtering the input data object using the second memory buffer, as discussed above at least in the context of FIGS. 9 and 11-13. In particular of these embodiments, filtering the input data object using the second memory buffer can include: determining whether the second memory buffer is full; and after determining that the second memory buffer is full, reallocating the second memory buffer to have a second size that is larger than the first size, as discussed above at least in the context of FIGS. 9 and 11-13. In more particular of these embodiments, the second memory buffer can include a contiguous memory buffer, and where reallocating the second memory buffer to have the second size can include: allocating a contiguous block of memory having the second size; copying the second memory buffer into the contiguous block of memory; freeing the second memory buffer; and designating the contiguous block of memory as the second memory buffer, as discussed above at least in the context of FIGS. 4 and 9.

In other particular of these embodiments, filtering the input data object using the second memory buffer can include: after completing filtering of the input data object using the second memory buffer: determining an identifier and a size of the filtered data object and storing the identifier and a size of the filtered data object in a cache of memory, as discussed above at least in the context of FIGS. 5 and 9.

In still other particular of these embodiments, filtering the input data object using the second memory buffer can include: determining a difference between a size of the second memory buffer and a size of the filtered data object; determining whether the difference is greater than a memory reduction size; and after determining that the difference is greater than a memory reduction size, reducing the size of the second memory buffer, as discussed above at least in the context of FIG. 8. In even other particular of these embodiments, where reducing the size of the second memory buffer can include: determining an unused portion of the second memory buffer to be freed; and freeing the unused portion of the second memory buffer, as discussed above at least in the context of FIG. 8.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
   receiving, at a computing device, an input file to be filtered by the computing device;
   detecting a first reference to an image within the input file;
   determining that the image within the input file has not been previously filtered by the computing device;
   after determining that the image within the input file has not been previously filtered by the computing device, the computing device:
   determining an estimated size of the image,
   allocating a first memory buffer having a first size to store a first filtered version of the image, wherein the first size is based on the estimated size,
   filtering the image using the first memory buffer,
   determining that a difference between a size of the first memory buffer and a size of the filtered image is greater than a threshold memory reduction size, and
   based on the difference being greater than the threshold memory reduction size, reducing the size of the first memory buffer by a first amount of memory units;
   detecting a second reference to the image within the input file;
   determining that the image within the input file has been previously filtered by the computing device;
   after determining that the image within the input file has been previously filtered by the computing device, the computing device:
   determining a previously filtered data size for the image,
   allocating a second memory buffer to store a second filtered version of the image based on the previously filtered data size, and
   filtering the image using the second memory buffer; and
   printing the filtered image on paper using data stored in the second memory buffer.

2. The method of claim 1, wherein receiving the input file to be filtered comprises receiving an input file to be decompressed, and wherein filtering the image using the first memory buffer comprises decompressing the image using the first memory buffer.

3. The method of claim 1, wherein the computing device comprises a cache of memory and wherein determining whether the image has been previously filtered comprises determining whether image has been previously filtered based on data stored in the cache of memory.

4. The method of claim 3, wherein the data stored in the cache of memory include one or more cache entries related to previously filtered data objects, and wherein a cache entry of the one or more cache entries includes: an identifier of a previously filtered data object, and an unfiltered data size for the previously filtered data object.

5. The method of claim 4, wherein the cache entry further includes a type of the previously filtered data object.

6. The method of claim 1, wherein filtering the image using the first memory buffer comprises:
   determining whether the first memory buffer is full; and
   after determining that the first memory buffer is full, reallocating the first memory buffer to have a second size that is larger than the first size.

7. The method of claim 6, wherein the first memory buffer comprises a contiguous memory buffer, and wherein reallocating the first memory buffer to have the second size comprises:
   allocating a contiguous block of memory having the second size;
   copying the first memory buffer into the contiguous block of memory;
   freeing the first memory buffer; and
   designating the contiguous block of memory as the first memory buffer.

8. The method of claim 1, further comprising:
   after completing filtering of the image using the first memory buffer:
   determining an identifier and a size of the filtered image; and
   storing the identifier and a size of the filtered image in a cache of memory.

9. The method of claim 1, wherein reducing the size of the first memory buffer comprises:
   determining an unused portion of the first memory buffer to be freed; and
   freeing the unused portion of the first memory buffer.

10. The method of claim 1, wherein the memory reduction size is a predetermined number of memory units.

11. The method of claim 1, wherein reducing the size of the first memory buffer comprises reducing the size of the first memory buffer such that the first memory buffer has a reduced size, and wherein the method further comprises:
    determining that a second difference between the reduced size of the first memory buffer and the size of the filtered image is greater than the threshold memory reduction size; and
    based on the second difference being greater than the threshold memory reduction size, further reducing the size of the first memory buffer by the first amount of memory units.

12. A computing device, comprising:
    one or more processors; and
    data storage configured to store at least executable instructions that, when executed by the one or more processors, cause the computing device to perform functions comprising:
    receiving an input file;
    detecting a first reference to an image within the input file;
    determining that the image within the input file has not been previously filtered by the computing device;
    after determining that the image within the input file has not been previously filtered by the computing device:
    determining an estimated size of the image,
    allocating a first memory buffer having a first size to store a first filtered version of the image, wherein the first size is based on the estimated size,
    filtering the image using the first memory buffer,
    determining that a difference between a size of the first memory buffer and a size of the filtered image is greater than a threshold memory reduction size, and
    based on the difference being greater than the threshold memory reduction size, reducing the size of the first memory buffer by a first amount of memory units;
    detecting a second reference to the image within the input file;
    determining that the image within the input file has been previously filtered by the computing device;
    after determining that the image within the input file has been previously filtered by the computing device:
    determining a previously filtered data size for the image,
    allocating a second memory buffer to store a second filtered version of the image based on the previously filtered data size, and filtering the image using the second memory buffer; and
    printing the filtered image on paper using data stored in the second memory buffer.

13. The computing device of claim 12, wherein receiving the input file comprises receiving an input file to be decompressed, and wherein filtering the image using the first memory buffer comprises decompressing the image using the first memory buffer.

14. The computing device of claim 12, wherein the data storage comprises a cache of memory and wherein determining whether the image has been previously filtered comprises determining whether the image has been previously filtered based on data stored in the cache of memory.

15. The computing device of claim 14, wherein the data stored in the cache of memory include one or more cache entries related to previously filtered data objects, and wherein a cache entry of the one or more cache entries includes: an identifier of a previously filtered data object, and an unfiltered data size for the previously filtered data object.

16. The computing device of claim 12, wherein filtering the image using the first memory buffer comprises:
    determining whether the first memory buffer is full; and
    after determining that the first memory buffer is full, reallocating the first memory buffer to have a second size that is larger than the first size by at least:
    allocating a contiguous block of memory having the second size;
    copying the first memory buffer into the contiguous block of memory;
    freeing the first memory buffer; and
    designating the contiguous block of memory as the first memory buffer.

17. A non-transitory computer readable medium, configured to store at least executable instructions that, when executed by one or more processors of a computing device, cause the computing device to perform functions comprising
    receiving an input file;
    detecting a first reference to an image within the input file;
    determining that the image within the input file has not been previously filtered;
    after determining that the image within the input file has not been previously filtered by the computing device:
    determining an estimated size of the image, allocating a first memory buffer having a first size to store a first filtered version of the image, wherein the first size is based on the estimated size, filtering the image using the first memory buffer, determining that a difference between a size of the first memory buffer and a size of the filtered image is greater than a threshold memory reduction size, and based on the difference being greater than the threshold memory reduction size, reducing the size of the first memory buffer by a first amount of memory units;

detecting a second reference to the image within the input file;

determining that the image within the input file has been previously filtered by the computing device;

after determining that the image within the input file has been previously filtered by the computing device:

determining a previously filtered data size for image, allocating a second memory buffer to store a second filtered version of the image based on the previously filtered data size, and filtering the image using the second memory buffer; and printing the filtered image on paper using data stored in the second memory buffer.

\* \* \* \* \*